Jan. 31, 1961  W. K. M. KLEINE  2,969,699
DRILL HEADS AND CUTTING TOOLS THEREFOR
Filed March 15, 1955
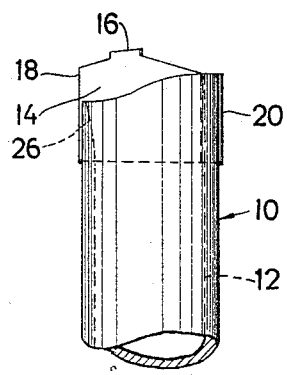
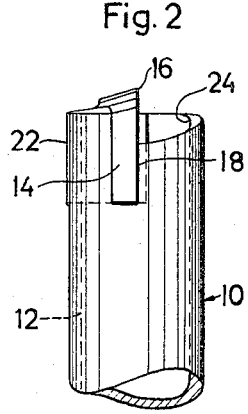
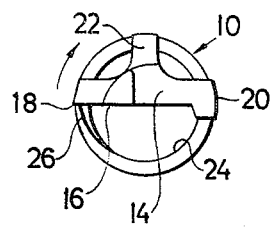

United States Patent Office 2,969,699
Patented Jan. 31, 1961

2,969,699

DRILL HEADS AND CUTTING TOOLS THEREFOR

Werner Kurt Max Kleine, Bremen-Mahndorf, Germany

Filed Mar. 15, 1955, Ser. No. 494,422

2 Claims. (Cl. 77—68)

This invention relates to a drill head of the kind having an internal bore, a flat cutting tool secured thereto formed of a metal harder than that of the drill head and having one or more cutting edges located on one side of the centre line of the head and projecting outside the head, said head also carrying a guiding abutment arranged substantially diametrically opposite one of the cutting edges and a second guiding abutment located intermediate said cutting edge and the first mentioned abutment.

In my co-pending patent application Serial No. 410,261, filed February 15, 1954, there is described a drill head having the cutting tool of such radial dimension as to comprise also the opposite guiding abutment. Between the cutting edge and the guiding abutment there is provided a further guiding abutment which, like the first-mentioned abutment, is intended to take up lateral pressure created on operation of the cutting tool.

One object of my invention is to improve the drill head of the kind set forth above with regard to its working properties.

A further object of my invention is to simplify the manufacture of the drill head.

A still further object of my invention is to avoid oscillations otherwise caused by lateral forces generated by the cutting tool.

According to one feature of my invention in a drill head of the kind mentioned above the two guiding abutments bear against the cutting tool.

Preferably one or each of the abutments is formed integrally with the cutting tool.

My invention also includes as an article of manufacture a cutting tool for a drill head of the kind specified comprising a substantially flat portion having at one end one or more cutting edges and at the opposite end a guiding abutment and also provided intermediate its ends with a further guiding abutment projecting from said flat portion.

While the consumption of the relatively expensive cutting tool material becomes greater than in the construction described in my above-mentioned application the drill head has proved to possess properties which are in many respects improved.

Further objects and advantages of my invention will be apparent from the following description considered in connection with the accompanying drawing, which forms part of this specification and of which:

Figs. 1 and 2 show part of a drill head or drill pipe in elevation in two views at right angles to each other.

Fig. 3 is a plan view thereof.

Referring to the drawing, a drill head designated by 10, is formed with an internal axially extending bore 12 and is adapted to be connected to a similarly hollow shank (not shown). The free end of the drill head is formed with slots for a cutting tool 14 constructed in accordance with the invention. The cutting tool comprises a flat portion extending diametrically over the whole head in the proximity of the centre thereof and having on one side a preferably step-shaped radially extending cutting edge 16 and an axial cutting edge 18, both of which project beyond the drill head.

The cutting edge 16 does not project so much as to reach the centre line of the head but ends at a distance from said centre line which may amount to about 10% of the diameter of said head or even more. The line representing the cutting edge 16 in Fig. 3 is located slightly above the centre line of the drill head according to said figure.

At the side opposite to the cutting edges the flat cutting tool portion is shaped to form a guiding abutment 20, which is preferably of greater thickness than the remainder of the flat portion. Extending from the flat portion approximately centrally thereof or from a point located somewhat nearer to the cutting edge 18 than to the guiding abutment 20 is a further guiding abutment 22 comprising an element bearing against the flat portion and preferably made integrally with the latter.

The cutting tool with its guiding abutments, which in known manner is made from a material harder than that of the drill head 10, is secured to the latter for instance by brazing. The bore 12 opens at the end of the drill head into a generally semi-circular opening 24, which is bounded by the rim of the drill head and by the flat portion of the cutting tool. Due to the construction described above this opening can be made larger than hitherto. The wall of the drill head is preferably made thinner in a direction toward the cutting edge 18, as indicated at 26. The opening 24 serves as an outlet for the cooling medium and any chips formed in the drilling operation.

Normally the drill head is stationary during operation whereas the workpiece rotates in the direction indicated by the arrow in Fig. 3. It is of advantage to have the surfaces of the guiding abutments 20 and 22 projecting beyond the drill head formed somewhat obliquely relative to the periphery of the drill head, so as to produce wedge-shaped clearances between the guiding abutments and the wall of the bore in the workpiece in a manner similar to that in a friction bearing, said clearances diminishing in the direction of rotation of the workpiece, thus creating lubricant films to some extent in said clearances which reduce the friction between the abutments and the wall of the bore.

While one more or less specific embodiment of my invention has been described, it is to be understood that this is for the purpose of illustration only and that my invention is not to be limited thereby, but its scope is to be determined by the appended claims.

What I claim is:

1. Rotary drill mechanism comprising a hollow drill head and a cutting bit secured to said head, said bit being comprised of metal harder than that of said drill head and being in the form of a bar substantially T-shaped in transverse cross section extending transversely across and substantially diametrically of said drill head and having a length along the greater length of the T-section greater than the diameter of the drill head, one end of said bit extending radially beyond the circumference of said drill head to provide a cutting edge and the opposite end of said bit extending beyond the circumference of said drill head to provide a bearing surface for engaging the wall of the bore at a place substantially diametrically opposite the place engaged by the cutting edge of said bit, the laterally extending branch of the T-shaped bit extending beyond the circumference of said head to provide a further bearing surface for engaging the wall of the bore cut by said bit at a place circumferentially intermediate the cutting edge of said bit and said first mentioned bearing surface, said hollow drill head being axially slotted at three circumferentially spaced places to receive the diametrically opposed portions of the bit providing the aforesaid cutting edge, the bearing surface of the bit for engaging the wall at a place substantially diametrically opposite the place engaged by said cutting edge and the laterally extending branch of the bit providing the aforesaid further bearing surface at a place circumferentially intermediate the cutting edge of the bit and the first mentioned bearing surface.

2. A mechanism as defined in claim 1 in which the bearing surface substantially opposite the cutting surface is wider circumferentially than the portion of the tool carrying the cutting surface.

References Cited in the file of this patent
UNITED STATES PATENTS 2,708,852   Wohlfahrt _____ May 24, 1955